(12) United States Patent
Schmidt et al.

(10) Patent No.: US 7,042,962 B2
(45) Date of Patent: May 9, 2006

(54) LMS-BASED CHANNEL ESTIMATION

(75) Inventors: Michael Schmidt, Dresden (DE);
Menno Mennenga, Dresden (DE);
Thomas Hanusch, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 777 days.

(21) Appl. No.: 10/259,715

(22) Filed: Sep. 27, 2002

(65) Prior Publication Data

US 2003/0169832 A1    Sep. 11, 2003

(30) Foreign Application Priority Data

Mar. 8, 2002    (DE)    ................. 102 10 234

(51) Int. Cl.
*H04L 27/06*    (2006.01)
(52) U.S. Cl. .................................... 375/340
(58) Field of Classification Search ................ 375/232, 375/340–343, 346, 350; 455/130
See application file for complete search history.

(56) References Cited

U.S. PATENT DOCUMENTS

| 6,021,161 | A | * | 2/2000 | Yamaguchi et al. ........ 375/232 |
| 6,130,909 | A |   | 10/2000 | Anvari et al. |
| 6,757,547 | B1 | * | 6/2004 | Goeddel ....................... 455/504 |
| 2003/0081763 | A1 | * | 5/2003 | Tang et al. ............. 379/406.01 |
| 2003/0161415 | A1 | * | 8/2003 | Krupka ........................ 375/340 |
| 2004/0038650 | A1 | * | 2/2004 | Yang ........................... 455/130 |

OTHER PUBLICATIONS

Office action in Application No. DE 10210234.1 issued Jan. 15, 2004.
Kammeyer, K.-D. "Nachrichtenubertragung", 1992, Stuttgart, Teubner Verlag, ISBN 3-519-06142-2, pp. 196 205.

* cited by examiner

*Primary Examiner*—Don N. Vo
(74) *Attorney, Agent, or Firm*—Meyertons Hood Kivlin Kowert & Goetzel, P.C.; B. Noël Kivlin

(57) ABSTRACT

A data communications device and method is provided that apply an LMS (Least Mean Square) channel estimation. A coefficient calculation unit generates a signal that represents at least one channel coefficient that is indicative of a property of the channel such as its finite impulse response. Further, an error calculation unit generates an error signal. Dependent on the error signal, the channel coefficients are updated by performing the LMS algorithm using a step size of two to a negative integer power. This allows for a simple, less complex implementation, and may be applied in a wireless local area network receiver for adjusting filter coefficients.

64 Claims, 4 Drawing Sheets

US 7,042,962 B2

LMS-BASED CHANNEL ESTIMATION

BACKGROUND OF THE INVENTION

1. Field of the Invention

The invention generally relates to data communications devices such as WLAN (Wireless Local Area Network) receivers and corresponding methods, and in particular to channel estimation techniques.

2. Description of the Related Art

In data communications systems, channels provide the connection between the transmitters and the receivers. Dependent on the physical media used, different types of channels can be distinguished. For instance, if the physical channel is a pair of wires that carry the electrical signal, the channel is a wire line channel. Other examples of physical channels are wireless electromagnetic channels and fiber-optic channels.

An example of a communications system using wireless channels is the WLAN system which is based on the 802.11b standard. A WLAN system is a flexible data communications system that uses radio frequency (RF) or infrared technology for transmitting and receiving data over the air, thereby minimizing the need for wired connections. Most WLAN systems use spread spectrum technology, a wide-band radio frequency technique developed for use in reliable and secure communications systems. Two types of spread spectrum radio systems are frequently used: frequency hopping and direct sequence systems.

In data communications systems such as WLAN systems it is often advantageous to perform a channel estimation to determine one or more channel coefficients that are indicative of channel properties. Some of the channel estimation techniques are LMS (Least Mean Square) based. The LMS algorithm is a technique that uses a stochastic gradient algorithm which in turn generally optimizes a function F with respect to some set of complex parameters $\underline{a}^* := (a_l, \ldots, a_m)$. An update of the parameters at iteration k can be determined by $$a^*(k+1) = a^*(k) - \delta \cdot \frac{\partial F}{\partial a(k)}$$

where $\delta$ is the step size (or learning rate). Usually, $F = |\epsilon|^2$ where $|\epsilon|^2$ is a quadratic expression of an error. The step size is the constant that specifies how much the gradient information is scaled to correct the previous coefficients. Thus, the step size determines the speed of convergence and the stability of the algorithm. If the step size $\delta$ is for instance very small, then the coefficients are not altered by a significant amount at each update. With a large step size, more gradient information is included in each update. However, when the step size is too large the coefficients may be changed too much and there will be no convergence anymore.

When performing channel estimation algorithms, in particular those which are based on the LMS technique, it has been found that the circuits used for this purpose are required to be of significant complexity so that channel estimation circuits are usually highly involved and lead to substantial circuit development and manufacturing costs.

SUMMARY OF THE INVENTION

An improved data communications device and method, and a corresponding WLAN receiver and integrated circuit chip, are provided that allow for performing a channel estimation in a simple, less complex implementation.

In one embodiment, there is provided a data communications device for use in a communications system. The device has a channel estimation unit that comprises a coefficient calculation unit for generating a signal that represents at least one channel coefficient which is indicative of a property of a channel in the communications system. The channel estimation unit further comprises an error calculation unit for generating an error signal that is indicative of an error of the generated at least one channel coefficient. The coefficient calculation unit is connected to receive the error signal and update the at least one channel coefficient dependent thereon by performing an LMS algorithm having a step size of two to a negative integer power.

In another embodiment, a WLAN receiver is provided that comprises a coefficient calculation unit for generating a signal that represents at least one channel coefficient which is indicative of a property of a channel in a WLAN system. The WLAN receiver further comprises an error calculation unit for generating an error signal that is indicative of an error of the generated at least one channel coefficient. The coefficient calculation unit is connected to receive the error signal and update the at least one channel coefficient dependent thereon by performing an LMS algorithm that has a step size of two to a negative integer power.

In a further embodiment, an integrated circuit chip may be provided for performing a channel estimation in a data communications device. The integrated circuit chip comprises coefficient calculation circuitry for generating a signal that represents at least one channel coefficient which is indicative of a property of a channel. The integrated circuit chip further comprises error calculation circuitry for generating an error signal that is indicative of an error of the generated at least one channel coefficient. The coefficient calculation circuitry is connected to receive the error signal and update the at least one channel coefficient dependent thereon by performing an LMS algorithm that has a step size of two to a negative integer power.

In another embodiment, there is provided a method of performing a channel estimation in a data communications device by generating at least one channel coefficient which is indicative of a property of a channel. The method comprises determining an error of the generated channel coefficient, and updating the channel coefficient by performing an LMS algorithm that has a step size of two to a negative integer power.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

While not being limited thereto, embodiments will be described hereafter in the context of decision feedback equalizers (DFE) in (direct sequence) spread spectrum systems such as WLAN systems. Such systems are usually designed to cope with multipath propagation and, hence, do not require an additional equalizer compared with single carrier systems.

For explaining the concept of equalization, let $s=\{s(k)\}$ be the transmitted sequence having values $s(k)$ of a QPSK constellation. The incoming discrete-time l-fold oversampled sequence can be modeled as $$\hat{s}(k)=[s_l a](k)+n_l(k)$$

where $s_l=\{0, \ldots, 0, s(k), 0, \ldots, 0, s(k+1), \ldots\}$ is the spread chip sequence, i.e. it has inserted l−1 zeros, $n_l=\{n_l(k)\}$ is the oversampled additive noise sequence, and $a=\{a_0(k), \ldots, a_{l-1}(k)\}k=0, \ldots, q$ is the fractionally spaced overall channel impulse response. The spread chip sequence and the overall channel impulse response are combined by discrete-time convolution.

It is thus assumed that the channel can be modeled as discrete-time finite impulse response filter. Since the channel is actually what is between the digital-to-analog converter at the transmitter side and the analog-to-digital converter at the receiver side, the channel combines the effect of the analog transmit filter, the (frequency selective) multipath propagation channel, the receive filter, and the analog-to-digital converter, in combination with a sampler. In the above equations, the estimate of the overall channel impulse response a is what is obtained by the channel estimation.

Figure 1:
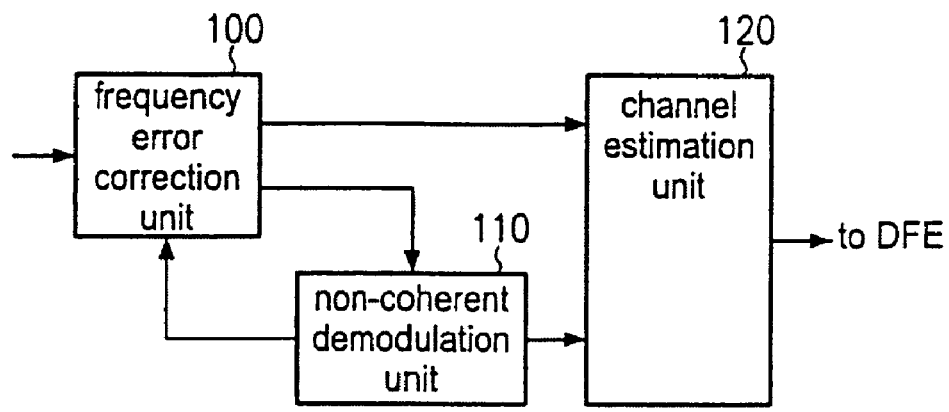
FIG. 1 illustrates parts of a WLAN receiver according to an embodiment, used for performing a channel estimation for controlling a decision feedback equalizer.

Referring now to the drawings and particularly to FIG. 1, the units of the data communications device are depicted which serve for estimating the channel coefficients to be used in the decision feedback equalizer. The channel coefficients are calculated in the channel estimation unit 120 using two input signals. The first input signal is the complex baseband signal that is output by the frequency error correction unit 100 which is used for correcting a frequency error in processing data signals that are received over the channel. The second input signal is a signal which is based on an output of the frequency error correction unit 100 but which is further demodulated using the non-coherent demodulation unit 110 with a hard-decision DQPSK (Differential QPSK). These two signals are used to compute the channel coefficients by employing the LMS adaptation algorithm. The LMS algorithm will adapt the coefficients of a finite impulse response filter such that the mean square error between the filter output and the signal received from the frequency error correction unit 100 will become minimum. This will be explained in more detail below.

Figure 2:
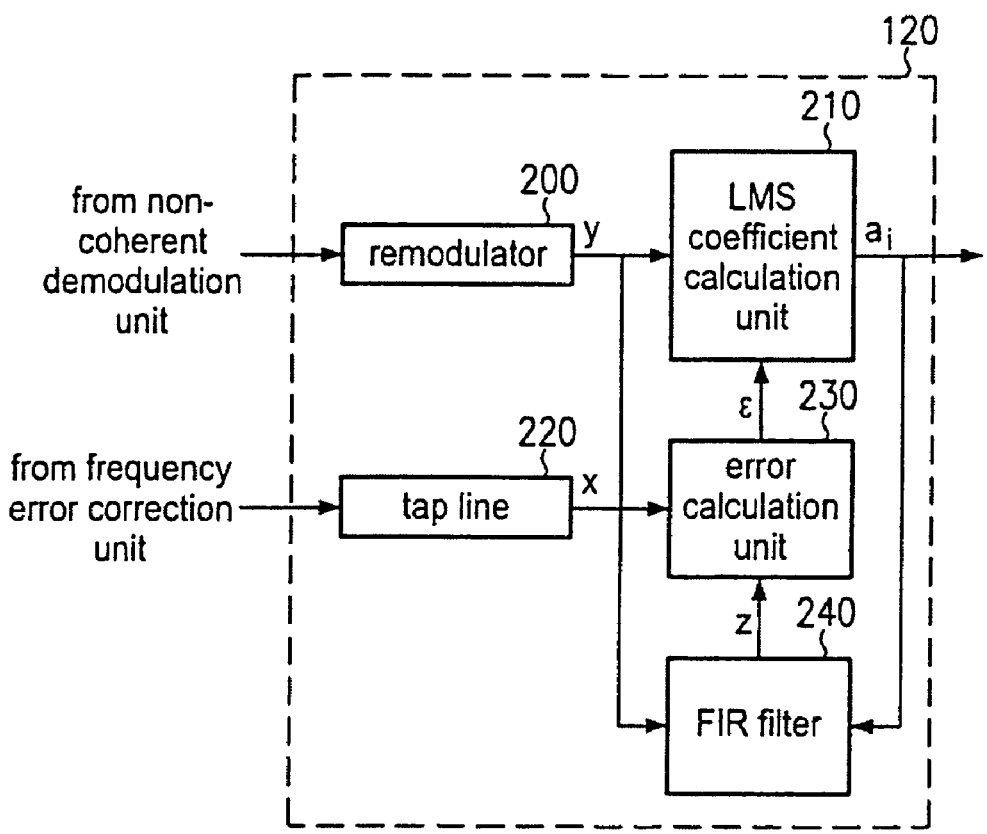
FIG. 2 illustrates the channel estimation unit shown in FIG. 1.

FIG. 2 illustrates the channel estimation unit 120 of FIG. 1 in more detail. Assuming that the input signal received from the frequency error correction unit 100 passes a tap line 220, the output of the tap line 220 is denoted x(k). The input received from the non-coherent demodulation unit 110 is fed to a remodulator 200 where the received demodulated signal is remodulated again, using differential modulation and a Barker sequence generator. The remodulated input will be called y(k) hereafter.

The channel estimation unit 120 further includes a discrete-time finite impulse response (FIR) filter 240 for modeling the channel. The FIR filter 240 receives the remodulated signal y(k) from remodulator 200 and the current coefficients $a_i$, and outputs a signal z(k) to the error calculation unit 230. The error calculation unit 230 further receives x(k) from tap line 220 and generates and error signal $\epsilon$. That is, if the current coefficients $a_i$ were ideal, the FIR filter 240 could model the channels such that signal z(k) were identical to the true value of x(k), thus leading to an error $\epsilon$ of zero. In any non-ideal situation, the error signal indicates a difference between the filter output z(k) and the signal x(k) received from the frequency error correction unit 100 via the tap line 220. Generally, an error is the difference between an observed value of a magnitude and the true or mean value as determined by a series of measurements of the same quantity. In the present embodiment, the error signal may therefore be written as:

$$\epsilon(k+1)=x(k)-z(k).$$

If a control signal $\sigma_\pi$ is used for toggling between the poly-phases of the FIR filter 240, the filter output calculation and coefficient update can be described as follows. It is to be noted that all the variable are complex numbers and k denotes the current clock cycle.

Depending on the value of the poly-phase control signal $\sigma_\pi$, the filter output is calculated according to:

$$z(k) = \begin{cases} \sum_{i=0}^{q} a_{2i}(k) \cdot y(k-i) & \text{if } \sigma_\pi = 0 \\ \sum_{i=0}^{q} a_{2i+1}(k) \cdot y(k-i) & \text{if } \sigma_\pi = 1 \end{cases}$$

Then, the overall number of complex filter taps is N=2 (q+1).

The LMS algorithm is performed in the LMS coefficient calculation 210 that receives the remodulated signal y(k) and the error signal $\epsilon(k)$. The actual update process of the coefficients $a_i$ may also depend on the poly-phase control signal $\sigma_{90}$. If $\sigma_\pi$ is equal to zero, only "odd" coefficients will be updated, whereas only "even" coefficients will be updated if $\sigma_\pi$ is equal to one. That is, the LMS update algorithm for even coefficients, i.e. coefficients being indexed by even values 2i, can be described as:

$$a_{2i}(k+1) = \begin{cases} a_{2i}(k) + \delta \cdot \varepsilon(k) \cdot y(k-i) & \text{if } \sigma_\pi = 1 \\ a_{2i}(k) & \text{if } \sigma_\pi = 0 \end{cases}$$

and for odd coefficients, i.e. coefficients being indexed by odd values 2i+1:

$$a_{2i+1}(k+1) = \begin{cases} a_{2i+1}(k) + \delta \cdot \varepsilon(k) \cdot y(k-i) & \text{if } \sigma_\pi = 0 \\ a_{2i+1}(k) & \text{if } \sigma_\pi = 1 \end{cases}$$

In these equations, $\delta$ is again the step size adaptation parameter. This parameter is given by $$\delta = \frac{1}{2^m} = 2^{-m}$$

i.e. it has a value of two to a negative integer power of m.

Figure 3:
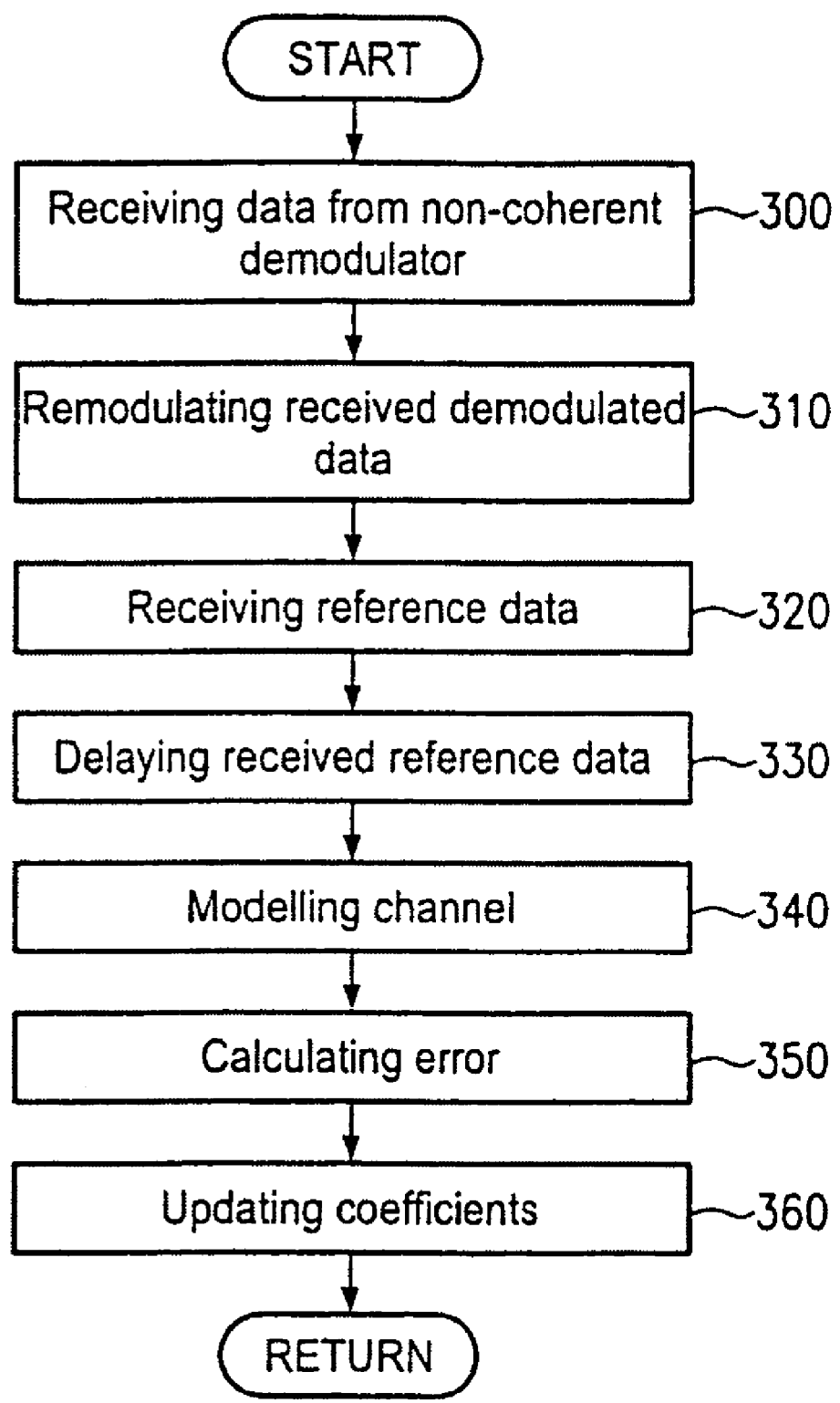
FIG. 3 is a flowchart illustrating the process of performing the LMS based channel estimation process according to an embodiment.

Referring now to FIG. 3 which illustrates a flowchart of performing the LMS based channel estimation for controlling a decision feedback equalizer of a WLAN receiver, the process starts with step 300 of receiving data from the non-coherent demodulation unit 110. The received demodulated data are then remodulated by remodulator 200 in step 310 to obtain signal y(k). During the preamble the remodulated signal y can be considered as real valued. In step 320, reference data is received from the frequency error correction unit 100, and this reference data is then delayed in step 330 by tap line 220 to obtain signal x(k).

In step 340, the FIR filter 240 receives signal y(k) from remodulator 200 and the current coefficients $a_i$ from LMS coefficient calculation unit 210 to model the channel and to generate signal z(k). This signal is then forwarded to the error calculation unit 230 where the error $\varepsilon(k+1)$ is calculated using signal x(k) received from the tap line 220 (step 350). Finally, based on signal y and the error signal $\varepsilon$, the LMS coefficient calculation unit 210 updates the coefficients $a_i$ in step 360.

While the flowchart of FIG. 3 describes the numerous steps to be performed in the shown sequence, other embodiments are possible where the steps are performed in different order, or even simultaneously. For instance, steps 320 and 330 of receiving and delaying the reference data could be performed before or simultaneously with steps 300 and 310 of receiving and remodulating the demodulated data.

Further, as the new coefficients are calculated based on the previous coefficients, the process may be performed iteratively, for instance by restarting the process once the coefficients are updated in step 360. It is to be noted that other schemes of performing the reiteration are possible. For instance, steps 300 and 310 of receiving and remodulating the demodulated data, and steps 320 and 330 of receiving and delaying the reference data may be performed simultaneously with, e.g., step 350 of calculating the error or step 360 of updating the coefficients. In this case, the receiving, remodulating and delaying steps would not relate to the same clock cycle but are used to prepare for the next iteration k+1.

Taking the process of FIG. 3 and referring back to FIG. 2, it is apparent that the channel estimation discussed so far is based on remodulated data. The purpose of remodulating the data is to adjust the data format to the Barker sequence samples received from the frequency error correction unit 100. The tap line registers 220 are used to delay the reference data received from the frequency error correction unit 100 such that it is aligned with the remodulated data. This delay is used to compensate for the processing delay of at least one clock tick that occurs in the non-coherent demodulation unit 110 and the remodulator 200.

Figure 4:
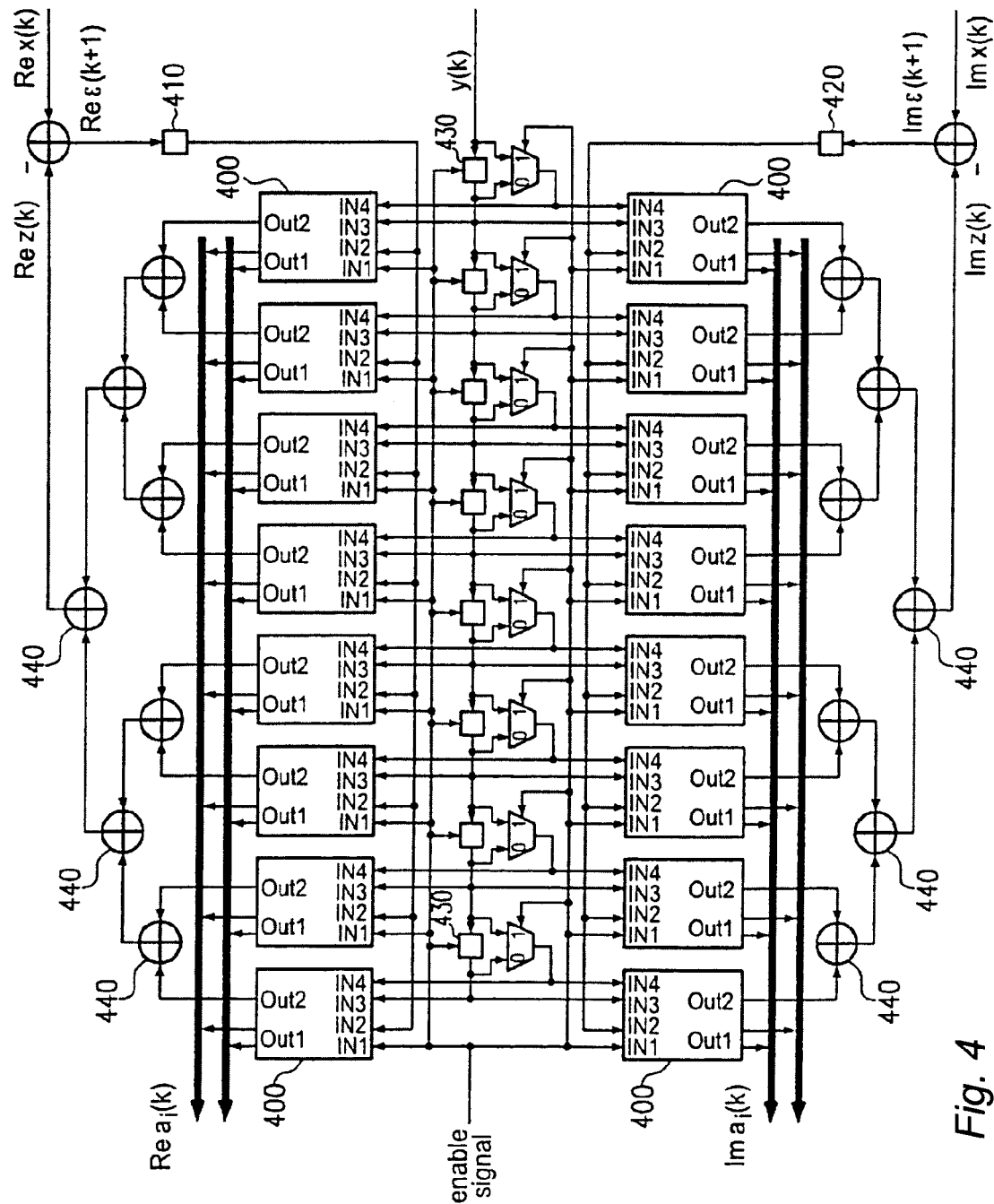
FIG. 4 illustrates another embodiment of a data communications device useable in a WLAN system.

Turning now to FIG. 4; another embodiment of performing an LMS based channel estimation in a WLAN receiver is shown. As apparent from the figure, there are sixteen submodules 400 that are each of the same structure. The submodules 400 are interconnected by adders 440 which are arranged in a tree configuration to establish the FIR calculation and FIR coefficient update functionality.

The circuit of FIG. 4 receives the real and imaginary parts of the delayed reference data x(k) and the remodulated data y(k). If enabled by setting the enabled signal to a high value, registers 430 form a tap line for storing the values of y(k).

As mentioned above, the adder trees 440 perform the finite impulse response modeling of the channel so that they output signal z(k). Using this signal and the received real or imaginary part of signal x(k), the error signal $\varepsilon$ is calculated by computing the difference therebetween. This error signal together with signal y is then used to update the coefficients and calculate the FIR response of the respective iteration.

Further, it was mentioned above that the channel coefficients are updated by performing the LMS algorithm using a step size $\delta$ of two to a negative integer power of m. This is realized in the embodiment of FIG. 4 by providing registers 410 and 420 for right-shifting the respective error signals. The amount of the right-shift may be predetermined and may for instance be set to six.

The submodules 400 together with the adders 440 form a poly-phase FIR filter. This means that the filter response is calculated alternately using the even filter coefficients $a_{2i}$ during one clock cycle and the odd coefficients $a_{2i+1}$ during the other cycle. That is, when the filter output is calculated using the even coefficients, the odd coefficients are updated using the LMS algorithm, and vice versa.

Figure 5:
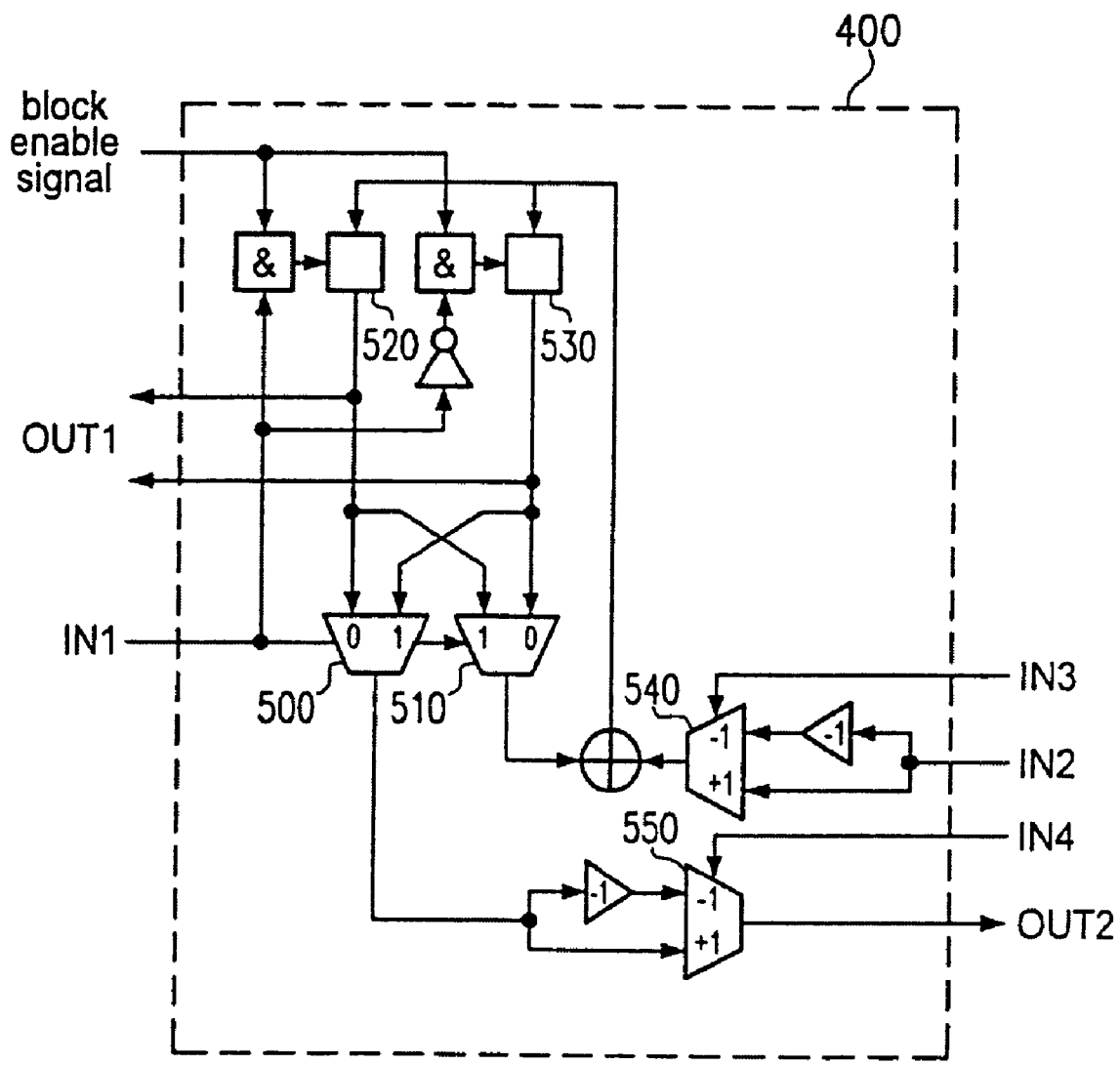
FIG. 5 illustrates a submodule used in the device of FIG. 4.

The submodules 400 shown in FIG. 4 are depicted in more detail in FIG. 5. In the submodule 400 shown in FIG. 5, the signal received at port IN1 controls which coefficient (odd or even) is updated while the other coefficient is used to calculate the filter output. This is realized by multiplexers 500 and 510. Multiplexer 500 selects one of registers 520 and 530 as input register for the filter output calculation while multiplexer 510 selects the registers as input registers for the coefficient update. Since the control signal received at port IN1 controls both multiplexers 500 and 510, it is ensured that registers 520 and 530 are selected alternately.

It is to be noted that the input values y(k) which are stored in the tap line 430 may be such that they can only assume the values of +1 and −1. This simplifies both the filter output calculation and the coefficient update. The filter calculation is simplified since there is not more than one multiplexer 550 necessary in each submodule 400 for this purpose. The coefficient update is simplified since the sign of the error signal input is kept or reversed again by using only one simple multiplexer 540.

As apparent from the foregoing, the embodiments employ an LMS step size of two to a negative integer power, for instance by using registers for right-shifting the error signal. Other embodiments are possible wherein, rather than shifting the error signal to realize the step size, the remodulated signal y, for example, is instead shifted. Further, instead of right-shifting the error signal or the remodulated data signal, the step size of two to a negative integer power may be realized by left-shifting the coefficient data $a_i$ that was obtained in the previous iteration.

The use of a step size of two to a negative integer power is advantageous as there are no multipliers needed for this purpose. Instead, shift registers and sign switchers can be used, leading to a significantly less complex circuit. Thus, by avoiding the use of multipliers, the LMS based channel estimation can be realized in a much simpler implementation, thereby reducing circuit development and manufacturing costs.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A data communications device for use in a communications system, the data communications device having a channel estimation unit comprising:
    a coefficient calculation unit for generating a signal representing at least one channel coefficient indicative of a property of a channel in said communications system; and
    an error calculation unit for generating an error signal indicative of an error of the generated at least one channel coefficient;
    wherein said coefficient calculation unit is connected to receive said error signal and update the at least one channel coefficient dependent thereon by performing an LMS (Least Mean Square) algorithm having a step size of two to a negative integer power.

2. The data communications device of claim 1, wherein said coefficient calculation unit comprises at least one shift register for applying the step size in the LMS algorithm by shifting the register data by a number of digits, said number being the value of said negative integer power.

3. The data communications device of claim 2, wherein said at least one shift register is connected to receive said error signal.

4. The data communications device of claim 1, further comprising:
    a frequency error correction unit for correcting a frequency error in processing data signals received over said channel;
    a non-coherent demodulation unit connected to said frequency error correction unit for demodulating an output signal of said frequency error correction unit and outputting the demodulated signal; and
    a remodulator connected to said non-coherent demodulation unit for remodulating said demodulated signal and outputting the remodulated signal;
    wherein said coefficient calculation unit is connected to receive said remodulated signal from said remodulator.

5. The data communications device of claim 4, wherein said remodulator is arranged for adjusting the data format of said demodulated signal to Barker sequence samples received from said frequency error correction unit.

6. The data communications device of claim 4, wherein said error calculation unit is connected to receive said reference signal from said frequency error correction unit.

7. The data communications device of claim 6, further comprising a tap line connected to said frequency error correction unit and said error calculation unit for delaying said reference data such that the delayed reference data is adjusted to said remodulated signal.

8. The data communications device of claim 4, wherein said coefficient calculation unit comprises registers forming a tap line for storing data according to said remodulated signal received from said remodulator.

9. The data communications device of claim 8, wherein the data stored in each of the tap line registers has a value of either +1 or −1.

10. The data communications device of claim 1, wherein said property of the channel in the communications system is the channel impulse response.

11. The data communications device of claim 10, wherein said channel estimation unit further comprises:
    an FIR (finite impulse response) filter for modeling the channel, said FIR filter being connected to receive said signal representing the at least one channel coefficient and generating an output signal dependent thereon.

12. The data communications device of claim 11, wherein said error calculation unit is connected to receive said output signal from said FIR filter, and is arranged for determining a difference between the received FIR filter output signal and a reference signal to generate said error signal.

13. The data communications device of claim 12, further comprising:
    a frequency error correction unit for correcting a frequency error in processing data signals received over said channel;
    wherein said error calculation unit is connected to receive said reference signal from said frequency error correction unit.

14. The data communications device of claim 13, further comprising:
    a tap line connected to said frequency error correction unit;
    wherein said error calculation unit is connected to said tap line to receive said reference signal.

15. The data communications device of claim 11, wherein said FIR filter is connected to receive an input signal generated from data signals received over said channel.

16. The data communications device of claim 15, further comprising:
    a frequency error correction unit for correcting a frequency error in processing data signals received over said channel;
    a non-coherent demodulation unit connected to said frequency error correction unit; and
    a remodulator connected to said non-coherent demodulation unit;
    wherein said input signal is generated from said data signals received over said channel by remodulating demodulated output signals of said frequency error correction unit.

17. The data communications device of claim 15, wherein said input signal is a sequence of data having values of either +1 or −1.

18. The data communications device of claim 11, wherein said FIR filter is a poly-phase FIR filter.

19. The data communications device of claim 1, wherein said channel estimation unit further comprises a finite state machine for controlling operation of said coefficient calculation unit.

20. The data communications device of claim 1, wherein said negative integer power is the power of six.

21. The data communications device of claim 1, comprising an integrated circuit chip having circuitry forming said channel estimation unit.

22. The data communications device of claim 1, further comprising a DFE (decision feedback equalizer) unit receiving said signal representing said at least one channel coefficient, for adjusting filter coefficients in the DFE unit.

23. The data communications device of claim 1, wherein said communications system is a spread spectrum system.

24. The data communications device of claim 23, wherein said spread spectrum system is a direct sequence spread spectrum system.

25. The data communications device of claim 1, wherein said communications system is a WLAN (Wireless Local Area Network) system.

26. A WLAN (Wireless Local Area Network) receiver comprising:
 a coefficient calculation unit for generating a signal representing at least one channel coefficient indicative of a property of a channel in a WLAN system; and
 an error calculation unit for generating an error signal indicative of an error of the generated at least one channel coefficient;
 wherein said coefficient calculation unit is connected to receive said error signal and update the at least one channel coefficient dependent thereon by performing an LMS (Least Mean Square) algorithm having a step size of two to a negative integer power.

27. The WLAN receiver of claim 26, wherein said coefficient calculation unit comprises at least one shift register for applying the step size in the LMS algorithm by shifting the register data by a number of digits, said number being the value of said negative integer power.

28. The WLAN receiver of claim 27, wherein said at least one shift register is connected to receive said error signal.

29. The WLAN receiver of claim 26, further comprising:
 a frequency error correction unit for correcting a frequency error in processing data signals received over said channel;
 a non-coherent demodulation unit connected to said frequency error correction unit for demodulating an output signal of said frequency error correction unit and outputting the demodulated signal; and
 a remodulator connected to said non-coherent demodulation unit for remodulating said demodulated signal and outputting the remodulated signal;
 wherein said coefficient calculation unit is connected to receive said remodulated signal from said remodulator.

30. The WLAN receiver of claim 29, wherein said remodulator is arranged for adjusting the data format of said demodulated signal to Barker sequence samples received from said frequency error correction unit.

31. The WLAN receiver of claim 29, wherein said error calculation unit is connected to receive said reference signal from said frequency error correction unit.

32. The WLAN receiver of claim 31, further comprising a tap line connected to said frequency error correction unit and said error calculation unit for delaying said reference data such that the delayed reference data is adjusted to said remodulated signal.

33. The WLAN receiver of claim 29, wherein said coefficient calculation unit comprises registers forming a tap line for storing data according to said remodulated signal received from said remodulator.

34. The WLAN receiver of claim 33, wherein the data stored in each of the tap line registers has a value of either +1 or −1.

35. The WLAN receiver of claim 26, wherein said property of the channel in the communications system is the channel impulse response.

36. The WLAN receiver of claim 35, further comprising:
 an FIR (finite impulse response) filter for modelling the channel, said FIR filter being connected to receive said signal representing the at least one channel coefficient and generating an output signal dependent thereon.

37. The WLAN receiver of claim 36, wherein said error calculation unit is connected to receive said output signal from said FIR filter, and is arranged for determining a difference between the received FIR filter output signal and a reference signal to generate said error signal.

38. The WLAN receiver of claim 37, further comprising:
 a frequency error correction unit for correcting a frequency error in processing data signals received over said channel;
 wherein said error calculation unit is connected to receive said reference signal from said frequency error correction unit.

39. The WLAN receiver of claim 38, further comprising:
 a tap line connected to said frequency error correction unit;
 wherein said error calculation unit is connected to said tap line to receive said reference signal.

40. The WLAN receiver of claim 36, wherein said FIR filter is connected to receive an input signal generated from data signals received over said channel.

41. The WLAN receiver of claim 40, further comprising:
 a frequency error correction unit for correcting a frequency error in processing data signals received over said channel;
 a non-coherent demodulation unit connected to said frequency error correction unit; and
 a remodulator connected to said non-coherent demodulation unit;
 wherein said input signal is generated from said data signals received over said channel by remodulating demodulated output signals of said frequency error correction unit.

42. The WLAN receiver of claim 40, wherein said input signal is a sequence of data having values of either +1 or −1.

43. The WLAN receiver of claim 36, wherein said FIR filter is a poly-phase FIR filter.

44. The WLAN receiver of claim 26, further comprising a finite state machine for controlling operation of said coefficient calculation unit.

45. The WLAN receiver of claim 26, wherein said negative integer power is the power of six.

46. The WLAN receiver of claim 26, comprising an integrated circuit chip having circuitry formed thereon representing said coefficient calculation unit and said error calculation unit.

47. The WLAN receiver of claim 26, further comprising a DFE (decision feedback equalizer) unit receiving said signal representing said at least one channel coefficient, for adjusting filter coefficients in the filter feedback.

48. An integrated circuit chip for performing a channel estimation in a data communications device, the integrated circuit chip comprising:
 coefficient calculation circuitry for generating a signal representing at least one channel coefficient indicative of a property of a channel; and
 error calculation circuitry for generating an error signal indicative of an error of the generated at least one channel coefficient;
 wherein said coefficient calculation circuitry is connected to receive said error signal and update the at least one channel coefficient dependent thereon by performing an LMS (Least Mean Square) algorithm having a step size of two to a negative integer power.

49. A method of performing a channel estimation in a data communications device by generating at least one channel coefficient indicative of a property of a channel, the method comprising:
determining an error of the generated channel coefficient; and
updating the channel coefficient by performing an LMS (Least Mean Square) algorithm having a step size of two to a negative integer power.

50. The method of claim 49, wherein said updating by performing an LMS (Least Mean Square) algorithm having a step size of two to a negative integer power includes:
shifting register data by a number of digits, said number being the value of said negative integer power.

51. The method of claim 50, wherein said register data is said determined error of the generated channel coefficient.

52. The method of claim 49, further comprising:
receiving a demodulated signal; and
remodulating said demodulated signal;
wherein said LMS algorithm is performed based on the remodulated signal.

53. The method of claim 49, further comprising:
receiving a reference signal from a frequency error correction unit;
wherein said error is determined based on said reference signal.

54. The method of claim 53, further comprising:
delaying said reference signal such that the delayed reference signal is adjusted to said remodulated signal.

55. The method of claim 53, wherein the data of said reference signal has a value of either +1 or −1.

56. The method of claim 49, wherein said property of the channel is the channel impulse response.

57. The method of claim 56, further comprising:
modelling the channel impulse response based on the at least one channel coefficient; and
generating an output signal dependent thereon.

58. The method of claim 57, wherein said error is a difference between the generated output signal and a reference signal.

59. The method of claim 57, wherein said modelling is performed based on an input signal generated from data signals received over said channel.

60. The method of claim 59, wherein said input signal is generated from said data signals received over said channel by remodulating demodulated output signals of a frequency error correction unit.

61. The method of claim 59, wherein said input signal is a sequence of data having values of either +1 or −1.

62. The method of claim 49, wherein said negative integer power is the power of six.

63. The method of claim 49, further comprising:
outputting the updated channel coefficient to a DFE (decision feedback equalizer) unit for adjusting filter coefficients in the DFE unit.

64. The method of claim 49, wherein said channel is a WLAN (Wireless Local Area Network) channel.

* * * * *